United States Patent
Omura et al.

(10) Patent No.: US 7,025,396 B2
(45) Date of Patent: Apr. 11, 2006

(54) VEHICLE BUMPER STRUCTURE

(75) Inventors: Kazuo Omura, Wako (JP); Masayuki Shiga, Wako (JP); Makoto Fukuda, Wako (JP); Yoshimi Mizutani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/174,884

(22) Filed: Jul. 5, 2005

(65) Prior Publication Data

US 2006/0022472 A1 Feb. 2, 2006

(30) Foreign Application Priority Data

Jul. 28, 2004 (JP) ............... 2004-220625

(51) Int. Cl.
*B60R 19/02* (2006.01)
(52) U.S. Cl. ............ 293/102; 293/109; 293/121; 293/133
(58) Field of Classification Search ........... 293/102, 293/109, 120, 121, 122, 132, 133, 135, 136
See application file for complete search history.

(56) References Cited

U.S. PATENT DOCUMENTS

| | | | | |
|---|---|---|---|---|
| 4,457,547 A | * | 7/1984 | Sekiyama et al. | 293/110 |
| 4,968,076 A | * | 11/1990 | Kuroki | 293/121 |
| 6,360,441 B1 | * | 3/2002 | Himsl et al. | 29/897.2 |
| 6,575,510 B1 | * | 6/2003 | Weissenborn | 293/121 |
| 6,609,740 B1 | * | 8/2003 | Evans | 293/121 |
| 6,676,179 B1 | * | 1/2004 | Sato et al. | 293/115 |
| 6,848,730 B1 | * | 2/2005 | Evans | 293/121 |
| 6,877,785 B1 | * | 4/2005 | Evans et al. | 293/120 |
| 6,971,690 B1 | * | 12/2005 | Evans et al. | 293/102 |
| 2004/0066048 A1 | * | 4/2004 | Mooijman et al. | 293/120 |
| 2004/0119301 A1 | * | 6/2004 | Evans | 293/102 |
| 2004/0169381 A1 | * | 9/2004 | Evans et al. | 293/121 |
| 2004/0256867 A1 | * | 12/2004 | Evans et al. | 293/102 |
| 2005/0029821 A1 | * | 2/2005 | Evans | 293/133 |

FOREIGN PATENT DOCUMENTS

JP 2002-264740 9/2002

\* cited by examiner

*Primary Examiner*—Lori L. Coletta
(74) *Attorney, Agent, or Firm*—Rankin, Hill, Porter & Clark LLP

(57) ABSTRACT

A vehicle bumper structure includes a cushioning member provided at a rear surface of a rear bumper beam. The cushioning member has upper and lower hollow protrusions of different protrusion lengths extending transversely of the vehicle along the rear surface of the rear bumper beam. The upper hollow protrusion, having a protruding length longer than the protruding length of the lower hollow protrusion, includes a protrusion top with a pair of right and left slit-shaped openings provided on right and left sides of a central portion for allowing easy buckling of the upper protrusion.

11 Claims, 9 Drawing Sheets

VEHICLE BUMPER STRUCTURE

FIELD OF THE INVENTION

The present invention relates to vehicle bumper structures, and more particularly, to a vehicle bumper structure having a bumper beam extending transversely of a vehicle at an end of a vehicle body frame, and a cushioning member provided at a surface of the bumper beam.

BACKGROUND OF THE INVENTION

A conventional vehicle bumper structure in which, in order to absorb the impact of a vehicle collision, a cushioning member is provided at the rear of a rear bumper beam, and the rear bumper beam and the cushioning member are covered by a rear bumper cover (rear bumper face) is proposed in Japanese Patent Laid-Open Publication No. 2002-264740, for example. This bumper structure will be described with reference to FIG. 8.

A vehicle bumper structure 100 shown in FIG. 8 includes a rear bumper beam 103 extending transversely of a vehicle at a rear end 102a of a side member 102 in a rear part 101 of the vehicle body, a cushioning member 104 provided at a rear portion 103a of the rear bumper beam 103, and a rear bumper face 105 covering the rear bumper beam 103 and the cushioning member 104.

When the vehicle collides with a wall (not shown) or the like, for example, the bumper structure 100 absorbs the collision energy with the rear bumper beam 103 crushed via the cushioning member 104.

Recently, with the object of improving automobile design, some rear bumper faces have a rear lower portion narrowed down and formed in a forward curved shape. To adapt the rear bumper beam 103 shown in FIG. 8 to such rear bumper faces, it is necessary to make a rear lower portion 103b of the rear bumper beam 103 conform to such rear bumper faces.

An example of this configuration will be described with reference to FIG. 9.

Referring to FIG. 9, a rear lower portion 110a of a rear bumper face 110 is narrowed down and formed in a forward curved shape. Therefore, it is necessary to recess a rear lower portion 111a of a rear bumper beam 111 in a forward direction of the vehicle body in conformity with the rear lower portion 111a of the rear bumper face 110.

A rear upper portion 11b of the rear bumper beam 111 protrudes rearward of the vehicle body. The rear upper portion 111b is located at an upper half 112a of a side member 112. Therefore, when a collision force is applied to the rear upper portion 111b of the rear bumper beam 111 as shown by arrow F, the rear bumper beam 111 can incline in the direction of arrow a. Consequently, a being moment can be applied to a rear end portion of the side member 112.

In addition, if the rear bumper beam 111 inclines in the arrow direction, the load acting on the rear bumper beam 111 will escape. It is, therefore, difficult to sufficiently absorb collision energy produced in a collision by the rear bumper beam 111.

Some vehicle bumper structures are required to absorb small collision energy in a collision at low speed (lower than or equal to about 8 km/hr) or the like.

It is therefore desirable to prevent application of a bending moment to a side member in a low-speed collision and appropriately absorb collision energy.

SUMMARY OF THE INVENTION

According to an aspect of the present invention, there is provided a vehicle bumper structure which comprises: a bumper beam provided at an end of a vehicle body frame in such a manner as to extend transversely of a vehicle; a cushioning member provided at a surface of the bumper beam; and a bumper face covering the bumper beam and the cushioning member, the cushioning member having upper and lower elongated hollow protrusions of different protruding lengths along the surface of the bumper beam, one of the upper and lower hollow protrusions of a longer protruding length having a protrusion top formed with at least one slit-shaped opening.

Thus, the upper and lower hollow protrusions are provided along the surface of the bumper beam, and the upper and lower hollow protrusions are provided with different protruding lengths. The different protruding lengths of the upper and lower hollow protrusions allow the upper and lower hollow protrusions to fit along the shape of the bumper face.

Also, since the hollow protrusion having the longer protruding length is provided with the slit-shaped opening, the hollow protrusion of the longer protruding length can be easily and appropriately crushed. Consequently, when a light load is applied to the hollow protrusion of the longer protruding length due to a low-speed collision, the hollow protrusion can be appropriately crushed, preventing inclination of the bumper beam. This can prevent occurrence of a bending moment on the vehicle body frame when only the hollow protrusion having the longer protruding length is crushed.

In addition, since the hollow protrusion having the longer protruding length is configured to easily appropriately crush, after it is crushed to the protruding length of the hollow protrusion having a shorter protruding length and if both the hollow protrusions are further crushed, the hollow protrusions can be crushed in a similar way. Consequently, inclination of the bumper beam is prevented also when both the hollow protrusions are crushed. This prevents occurrence of a bending moment on the vehicle body frame when both the hollow protrusions are crushed simultaneously.

Since the hollow protrusion having the longer protruding length is formed with the slit-shaped opening to be easily and appropriately crushed, when only the hollow protrusion of the longer protruding length is crushed or when both the hollow protrusions are simultaneously crushed, the crushing can be done appropriately without inclining the bumper beams, resulting in good absorption of collision energy.

Preferably, the protrusion top has two openings spaced in a right-and-left direction with a central portion interposed therebetween.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
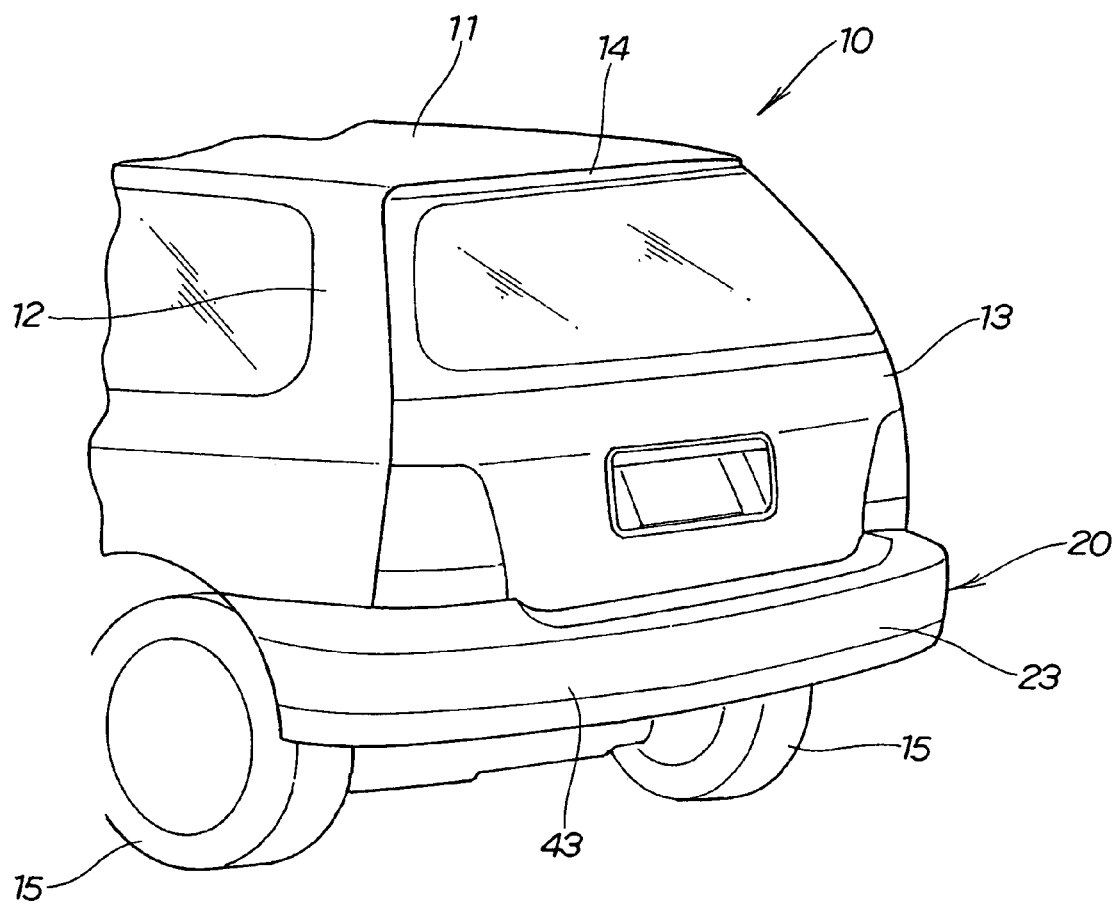
FIG. 1 is a perspective view of a vehicle provided with a vehicle bumper structure according to the present invention.

A vehicle 10 shown in FIG. 1 has a tailgate 13 provided at a rear portion 12 of a vehicle body 11, and a vehicle bumper structure 20 provided below the tailgate 13 and rearward of right and left rear wheels 15, 15.

The tailgate 13 has an upper edge portion 14 rotatably attached to the rear portion 12 of the vehicle body 11 via a hinge (not shown), thereby being supported on the hinge to be swingable to a closed position and to an open position. The closed position is a position in which the tailgate 13 closes a passenger compartment (not shown). The open position is a position in which to open the passenger compartment.

Hereinafter, the configuration of the vehicle bumper structure 20 will be described with reference to FIGS. 2 to 5.

Figure 2:
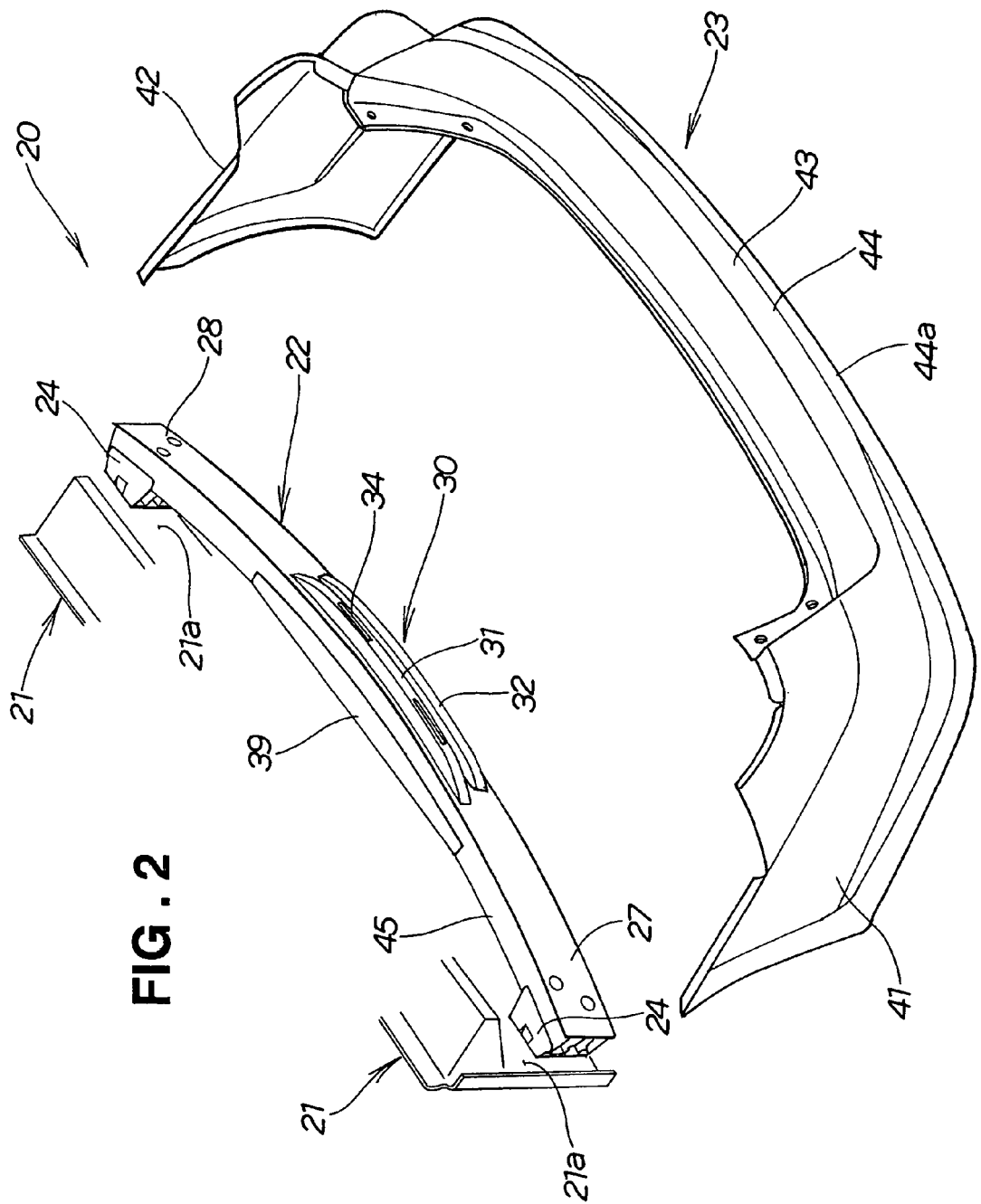
FIG. 2 is an exploded perspective view of a rear bumper beam and a rear bumper face.

As shown in FIG. 2, the vehicle bumper structure 20 includes a rear bumper beam (bumper beam) 22 extending transversely of the vehicle at a rear end (end) 21a of a vehicle body frame 21, and a rear bumper face (bumper face) 23 covering the rear bumper beam 22.

The rear bumper beam 22 is a reinforcing member in a curved shape having left and right end portions 27 and 28 mounted to the rear end 21a of the vehicle body frame 21 via mounting brackets 24, 24, respectively, and a rear surface 22a provided with a cushioning member 30.

The rear bumper face 23 is a resin member formed in a substantially U shape, and has left and right side portions 41 and 42 extending forward of the vehicle body, and a face body 43 extended between rear ends of the left and right side portions 41 and 42.

Figure 3:
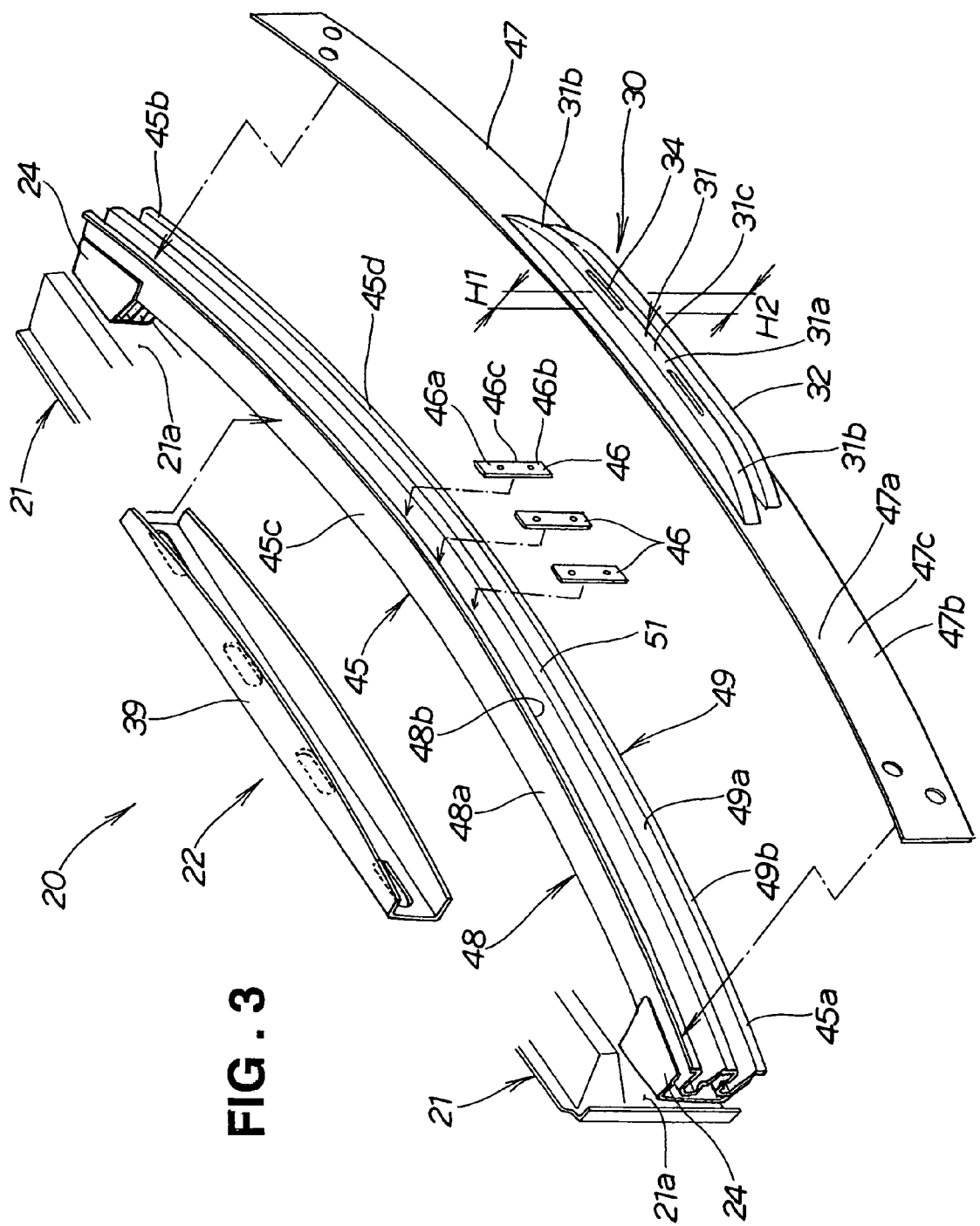
FIG. 3 is an exploded perspective view of the rear bumper beam shown in FIG. 2.
Figure 4:
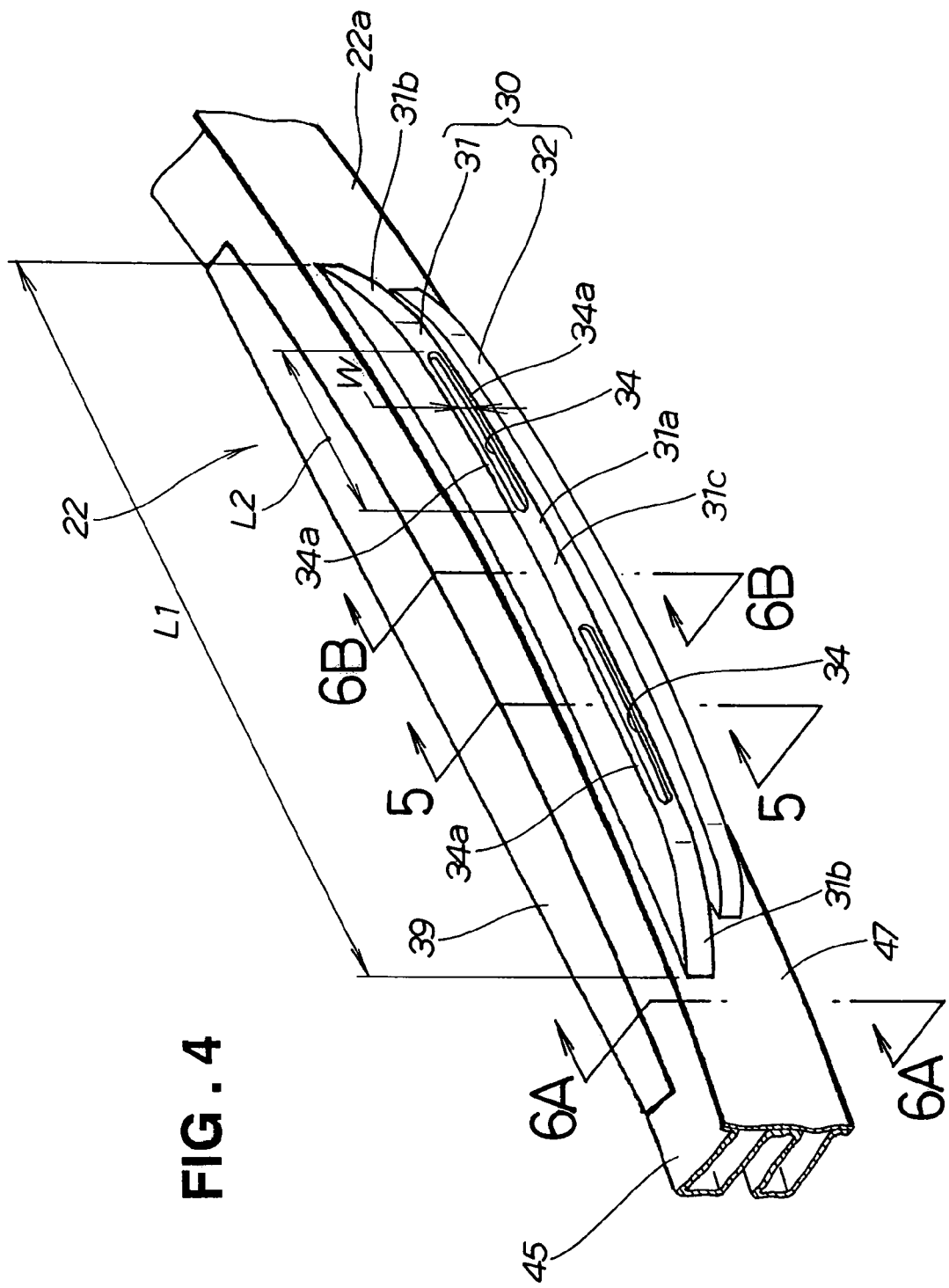
FIG. 4 is a perspective view of the assembled state of the rear bumper beam shown in FIG. 3.

Referring to FIGS. 3 and 4, the rear bumper beam 22 includes a beam body 45, a gusset 39 and a beam plate 47.

The beam body 45 has left and light end portions 45a and 45b mounted to the rear end 21a of the vehicle body frame 21 via the mounting brackets 24, 24.

The gusset 39 is provided at a front central portion 45c of the beam body 45. A plurality of (three in the example shown) reinforcing plates 46 are provided at specified spacing at a rear portion 45d of the beam body 45.

The beam plate 47 is provided along the rear portion 45d of the beam body 45, covering the reinforcing plates 46.

Figure 5:
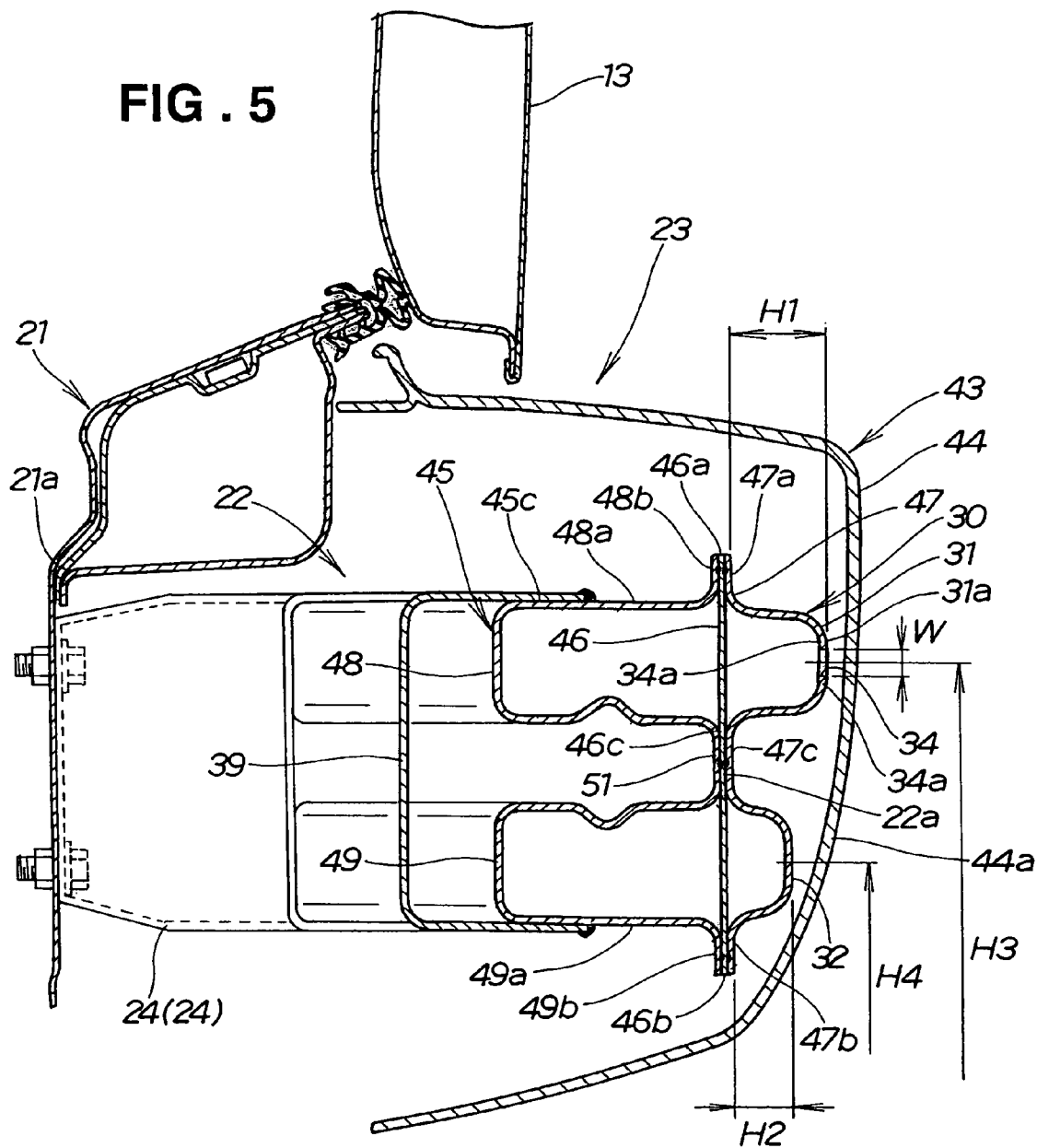
FIG. 5 is a cross-sectional view along line 5—5 in FIG. 4.

The beam body 45 has upper and lower elongated protrusions 48 and 49 connected by a connecting portion 51 (see also FIG. 5). The upper elongated protrusion 48 has an upper jutting portion 48b jutting out upward from an upper surface 48a thereof. The lower elongated protrusion 49 has a lower jutting portion 49b jutting out downward from a lower surface 49a thereof.

Upper end portions 46a, lower end portions 46b and middle portions 46c of the reinforcing plates 46 are joined by spot welding to the upper jutting portion 48b, lower jutting portion 49b and connecting portion 51 of the beam body 45, respectively.

The beam plate 47 is placed on the rear portion 45d of the beam body 45, and an upper edge portion 47a, lower edge portion 47b and middle portion 47c of the beam plate 47 are joined by spot welding to the upper jutting portion 48b, lower jutting portion 49b and connecting portion 51 of the beam body 45, respectively. The beam body 45 will be described in detail below with reference to FIG. 5.

The beam plate 47 has at its laterally central portion the cushioning member 30 protruding rearward of the vehicle body. The cushioning member 30 includes hollow protrusions 31 and 32 formed in two upper and lower elongations at the beam plate 47.

The upper hollow protrusion 31 and the lower hollow protrusion 32 are formed in a so-called hat-shaped cross section (see also FIG. 5). The rearward protruding length of the upper hollow protrusion 31 is H1 (see also FIG. 5). The rearward protruding length of the lower hollow protrusion 32 is H2 (see also FIG. 5). The protruding length H1 of the upper hollow protrusion 31 is formed greater than the protruding length H2 of the lower hollow protrusion 32. A pair of openings 34, 34 is formed in a protrusion top 31a of the upper hollow protrusion 31.

The lateral length of the upper hollow protrusion 31 is L1. Right and left ends of the upper hollow protrusion 31 constitute inclined surfaces 31b, 31b toward the protrusion top 31a. The protrusion top 31a is formed in a curved shape along the rear surface 22a of the bumper beam 22.

The pair of openings 34, 34 are slit-shaped openings formed separately right and left with respect to a central portion 31c of the protrusion top 31a. Each opening 34 is an elongated hole having length L2 and width W (see also FIG. 5).

The openings 34, 34, formed on the right and left of the central portion 31c, allow the central portion 31c to maintain a desired degree of rigidity.

The length L2 of the openings 34 is set at 120 to 140 mm, for example, and is preferably set at 130 mm. If the length L2 of the openings 34 is less than 120 mm, the length L2 of the openings 34 is so short that it becomes difficult to appropriately crush the upper hollow protrusion 31. If the length L2 of the openings 34 exceeds 140 mm, the length L2 of the openings 34 is so long that linear portions 34a, 34a of the peripheries of the openings 34 are bent inwardly of the upper hollow protrusion 31 in a curved shape, for example. The bent portions serve as reinforcing ribs, increasing the rigidity of the upper hollow protrusion 31.

The lower hollow protrusion 32, as compared to the upper hollow protrusion 31, has a lateral length shorter than the length L1 of the upper hollow protrusion 31, and the protruding length H2 smaller than the protruding length H1 of the upper hollow protrusion 31. These are only differences from the upper hollow protrusion 31, and the configuration is otherwise identical to the upper hollow protrusion 31.

Referring to FIG. 5, the beam body 45 of the rear bumper beam 22 has the upper and lower elongated protrusions 48 and 49, as described above. The upper and lower elongated protrusions 48 and 49 are connected in one piece by the connecting portion 51. The upper elongated protrusion 48 has the upper jutting portion 48b jutting out upward from the upper surface 48a. The lower elongated protrusion 49 has the lower jutting portion 49b jutting out downward from the lower surface 49a.

The upper elongated protrusion 48 and the lower elongated protrusion 49 are formed in a so-called hat-shaped cross section. The gusset 39 is provided at a laterally central front portion 45c of the beam body 45.

The upper end portions 46a, lower end portions 46b and middle portions 46c of the reinforcing plates 46 are joined by spot welding to the upper jutting portion 48b, lower jutting portion 49b and connecting portion 51 of the beam body 45, respectively.

At the same time, the beam plate 47 is placed on the reinforcing plates 46, and the upper edge portion 47a, lower edge portion 47b and middle portion 47c of the beam plate 47 are joined by spot welding to the upper end portions 46a, lower end portions 46b and middle portions 46c of the reinforcing plates 46.

The rear bumper face 23 covering the rear bumper beam 22 has, in a rear portion 44 of the face body 43, a lower portion (rear lower portion) 44a narrowed down and formed in a forward curved shape from a standpoint of design or the like.

In order to provide the cushioning member 30 along the rear surface 22a of the bumper beam 22, the two elongated hollow protrusions 31 and 32 having different protruding lengths are provided above and below as the cushioning member 30. In addition, the protruding length H1 of the upper hollow protrusion 31 is formed greater than the protruding length H2 of the lower hollow protrusion 32. This allows the upper and lower hollow protrusions 31 and 32 to be provided along the rear portion 44 of the rear bumper face 23.

The cushioning member 30 has the slit-shaped openings 34, 34 formed in the top portion 31a of the upper hollow protrusion 31 (see FIG. 4 for another opening 34). The reason for having the openings 34, 34 will be described below.

The upper hollow protrusion 31 is located at the same level as upper halves of the mounting brackets 24, 24. Therefore, if the upper hollow protrusion 31 on which a collision force is acting does not crush, the rear bumper beam 22 will be inclined counterclockwise (that is, upward) in FIG. 5. The inclination of the rear bumper beam 22 produces a bending moment on the vehicle body frame 21 via the mounting brackets 24, 24.

Therefore, in the present invention, the slit-shaped openings 34, 34 are formed in the upper hollow protrusion 31 as described above to facilitate crushing of the upper hollow protrusion 31. Consequently, when a light load is applied to the upper hollow protrusion 31 due to a low-speed collision, the upper hollow protrusion 31 can be appropriately crushed. The bumper beam 22 is thus prevented from inclining upward, or counterclockwise. This prevents occurrence of a bending moment on the vehicle body frame 21 via the mounting brackets 24, 24 when only the upper hollow protrusion 31 is crushed (see also FIGS. 2 and 3). That is, since a collision load in a low-speed collision is small, only the upper hollow protrusion 31 is deformed to absorb the collision load by the upper hollow protrusion 31 and prevent the load from affecting other components.

In addition, since the upper hollow protrusion 31 is configured to easily appropriately crush, after the upper hollow protrusion 31 is crushed to the protruding length H2 of the lower hollow protrusion 32 and if both the hollow protrusions 31 and 32 are further crushed, the hollow protrusions 31 and 32 can be crushed in a similar way. Consequently, the bumper beam 22 is prevented from inclining upward, or counterclockwise. This prevents occurrence of a bending moment on the vehicle body frame 21 (see also FIGS. 2 and 3) via the mounting brackets 24, 24 when the upper and lower hollow protrusions 31 and 32 are crushed simultaneously.

Since the upper hollow protrusion 31 is formed with the openings 34, 34 to be easily and appropriately crushed, when only the upper hollow protrusion 31 is crushed or when the upper and lower hollow protrusions 31 and 32 are simultaneously crushed, the crushing can be done appropriately without inclining the bumper beam 22. Crushing without inclining the bumper beam 22 allows collision energy to be absorbed well.

The center height H3 of the upper hollow protrusion is 508 mm (20 inches), for example. The center height H4 of the lower hollow protrusion 32 is 406 mm (16 inches), for example.

Figure 6A:
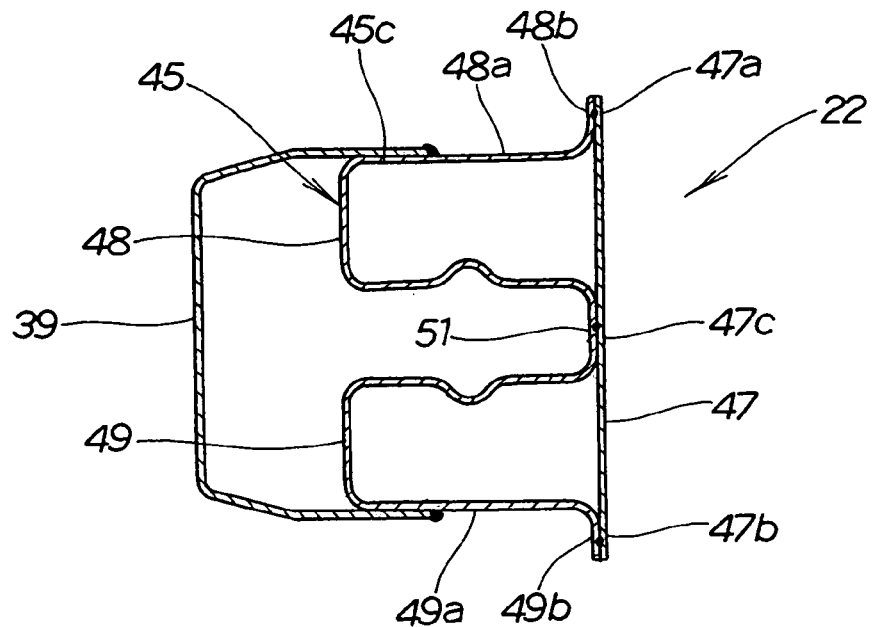
FIG. 6A is a cross-sectional view along line 6A—6A in FIG. 4.

As shown in FIG. 6A, the beam plate 47 is placed on the upper jutting portion 48b, lower jutting portion 49b and connecting portion 51 of the beam body 45, and the upper edge portion 47a, lower edge portion 47b and middle portion 47c of the beam plate 47 are joined by spot welding to the upper jutting portion 48b, lower jutting portion 49b and connecting portion 51, respectively.

Figure 6B:
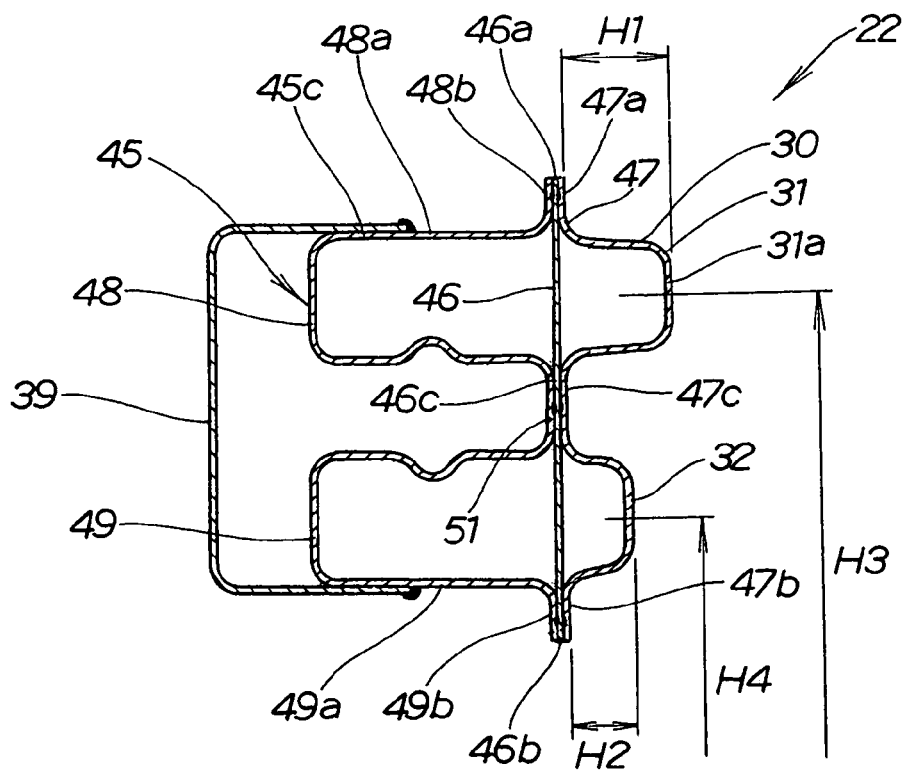
FIG. 6B is a cross-sectional view along line 6B—6B in FIG. 4.

As shown in FIG. 6B, the upper end portions 46a, lower end portions 46b and middle portions 46c of the reinforcing plates 46 are joined by spot welding to the upper jutting portion 48b, lower jutting portion 49b and connecting portion 51 of the beam body 45, respectively.

At the same time, the beam plate 47 is placed on the reinforcing plates 46, and the upper edge portion 47a, lower edge portion 47b and middle portion 47c of the beam plate 47 are joined by spot welding to the upper end portions 46a, lower end portions 46b and middle portions 46c of the reinforcing plates 46, respectively. The gusset 39 is provided at the central front portion 45c of the beam body 45.

Next, the operation of the vehicle bumper structure 20 when the rear portion 44 of the rear bumper face 23 collides with a wall 50 with the vehicle traveling at low speed will be described with reference to FIGS. 7A to 7D.

Figure 7A:
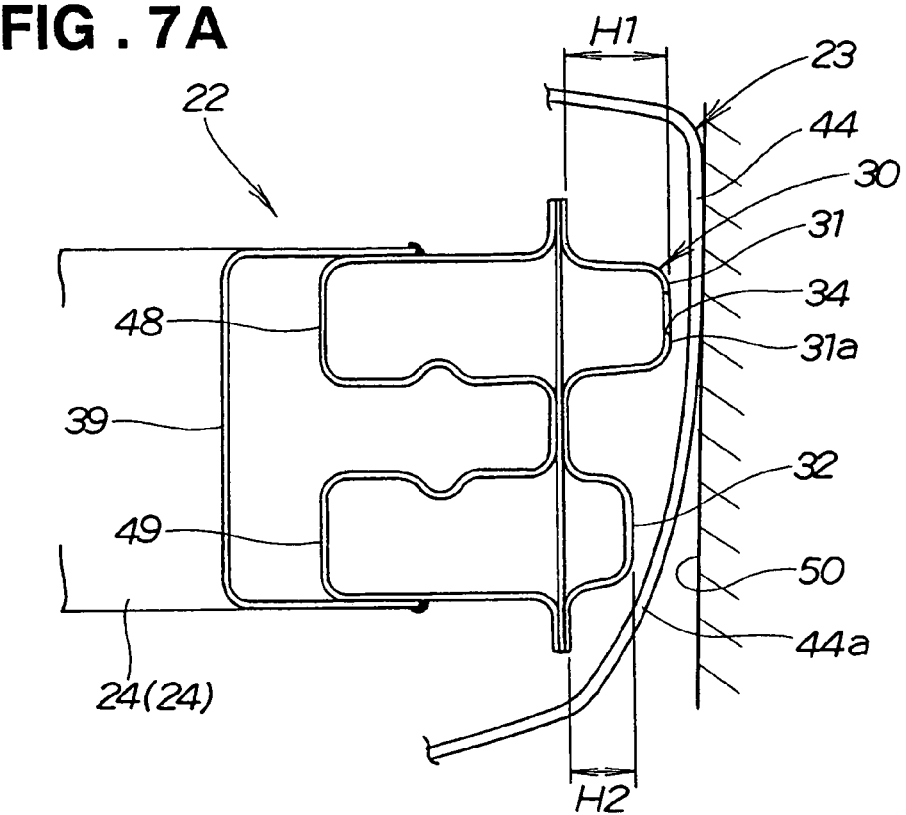
FIGS. 7A to 7D are diagrams showing a situation where a bumper face rear portion collides with a wall and a cushioning member deforms.

FIG. 7A shows the state where the rear portion 44 of the rear bumper face 23 collides with the wall 50.

Figure 7B:
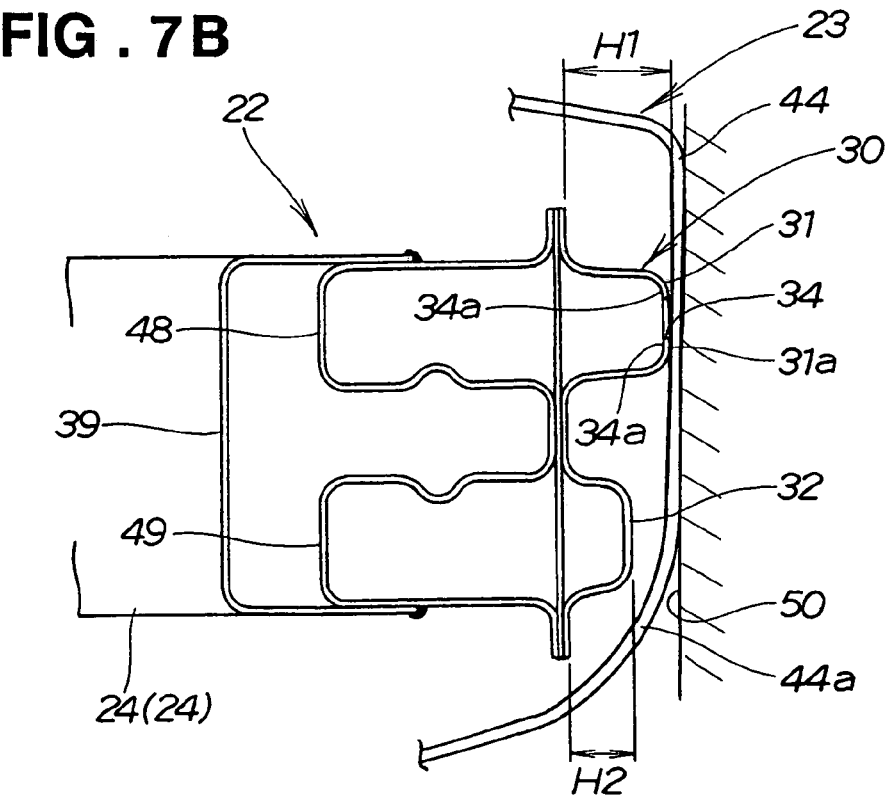

Referring to FIG. 7B, the rear bumper face 23 slightly deforms with the rear portion 44 abutting on the protrusion top 31a of the upper hollow protrusion 31. A light load due to the low-speed collision is applied to the upper hollow protrusion 31.

Herein, the length L2 of the slit-shaped openings 34, 34 formed in the upper hollow protrusion 31 (see FIG. 4 for another opening 34) is set at 130 mm, for example.

This allows the upper hollow protrusion 31 to be crushed appropriately by a light load while preventing the linear portions 34a, 34a (see also FIG. 4) of the peripheries of the openings 34 from bending in a curved shape inwardly of the upper hollow protrusion 31. Consequently, when a light load is applied to the upper hollow protrusion 31 due to a low-speed collision, the upper hollow protrusion 31 can be appropriately crushed, preventing the bumper beam 22 from inclining upward, or counterclockwise.

This prevents occurrence of a bending moment on the vehicle body frame 21 (see FIG. 5) via the mounting brackets 24, 24 when only the upper hollow protrusion 31 is crushed.

Figure 7C:
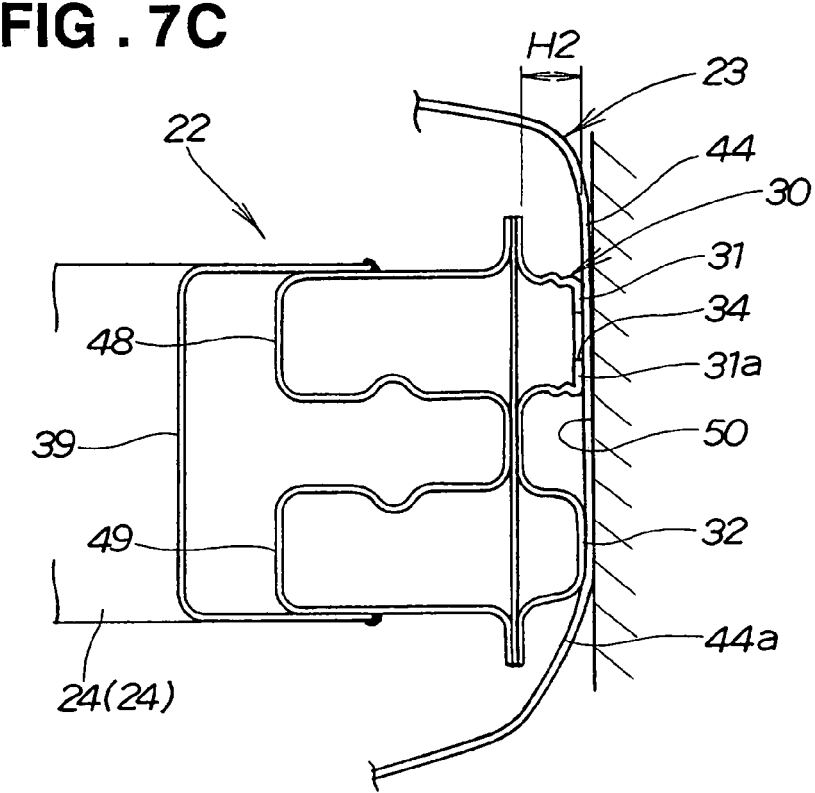

Referring to FIG. 7C, the upper hollow protrusion 31 is buckled to the protruding length H2 of the lower hollow protrusion 32. Then, the upper and lower hollow protrusions 31 and 32 can be crushed simultaneously.

Figure 7D:
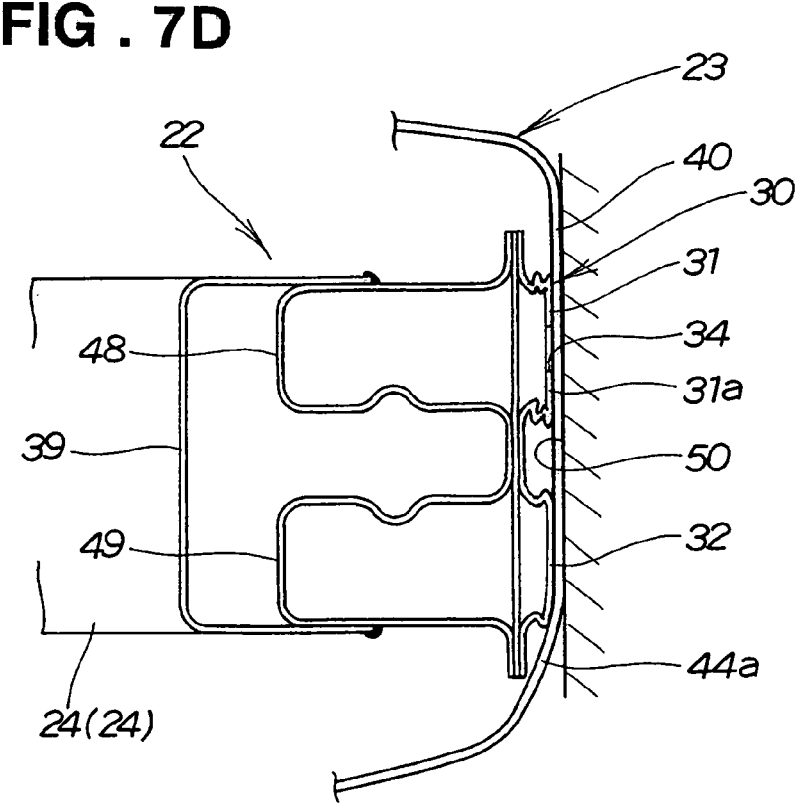
Figure 8:
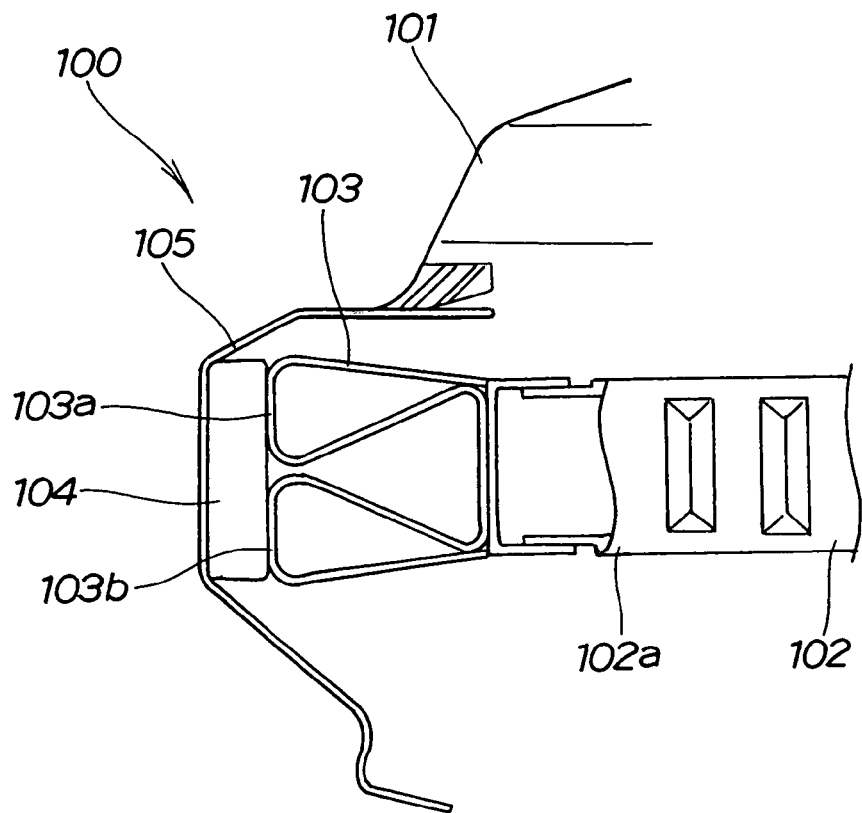
FIG. 8 is a schematic view of a bumper structure in a related art.
Figure 9:
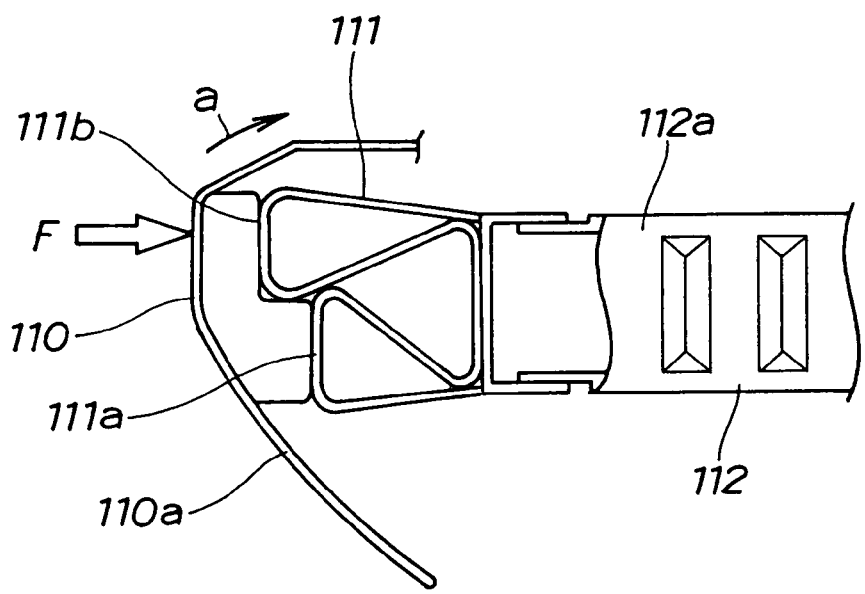
FIG. 9 is a schematic view of a bumper structure, showing an example where a lower portion of a rear bumper face is curved.

Referring to FIG. 7D, the simultaneous crushing of the upper and lower hollow protrusions 31 and 32 prevents the bumper beam 22 from inclining upward, or counterclockwise. This prevents occurrence of a bending moment on the vehicle body frame 21 (see FIG. 5) via the mounting brackets 24, 24 when the upper and lower hollow protrusions 31 and 32 are simultaneously crushed.

The upper hollow protrusion 31, having the openings 34, 34, can be easily and appropriately crushed. When only the upper hollow protrusion 31 is crushed, or when the upper and lower hollow protrusions 31 and 32 are simultaneously crushed, the crushing can be done appropriately without inclining the bumper beam 22. Consequently, collision energy can be absorbed well.

This embodiment has been described with the example where the vehicle bumper structure 20 is applied to a rear bumper. The vehicle bumper structure 20 can also be applied to a front bumper.

Obviously, various minor changed and modifications of the present invention are possible in the light of the above teaching. It is therefore to be understood that within the scope of the appended claims the invention may be practiced otherwise than as specifically described.

What is claimed is:

1. A vehicle bumper structure comprising:
   a bumper beam provided at an end of a vehicle body frame in such a manner as to extend transversely of a vehicle;
   a cushioning member provided on a front surface of the bumper beam; and
   a bumper face covering the bumper beam and the cushioning member,
   wherein the cushioning member extends along a surface of the bumper beam and has a pair of upper and lower elongated hollow protrusions, said upper protrusion having a first length and said lower protrusion having a second length, and wherein a longer one of said upper and lower protrusions has a protrusion top with at least one slit-shaped opening formed therein.

2. The bumper structure as set forth in claim 1, wherein the protrusion top has two slit-shaped openings spaced in a right-and-left direction with a central portion interposed therebetween.

3. The bumper structure according to claim 2, wherein the slit-shaped openings extend in a length direction of said protrusion top.

4. The bumper structure according to claim 3, wherein said first length is greater than said second length.

5. The bumper structure according to claim 4, wherein said upper protrusion has a first height and said lower protrusion has a second height.

6. The bumper structure according to claim 5, wherein said first height is greater than said second height.

7. A vehicle bumper structure comprising:
   a bumper beam provided at an end of a vehicle body frame in such a manner as to extend transversely of a vehicle;
   a cushioning member provided on a front surface of the bumper beam; and
   a bumper face covering the bumper beam and the cushioning member,
   wherein the cushioning member extends along a surface of the bumper beam and includes upper and lower elongated hollow protrusions, said upper protrusion has a first length and a first height while said lower protrusion has a second length and a second height, wherein said first height is different than said second height and said first length is different than said second height, and wherein a longer one of said upper and lower protrusions has a protrusion top defining at least one slit-shaped opening.

8. The bumper structure according to claim 7, wherein the protrusion top has two slit-shaped openings spaced in a right-and-left direction with a central portion interposed therebetween.

9. The bumper structure according to claim 8, wherein the slit-shaped openings extend in a length direction of said protrusion top.

10. The bumper structure according to claim 9, wherein said first length is greater than said second length.

11. The bumper structure according to claim 10, wherein said first height is greater than said second height.

* * * * *